May 5, 1953 P. W. GARBO 2,637,625
GASEOUS DIFFUSION PROCESS
Filed May 21, 1946
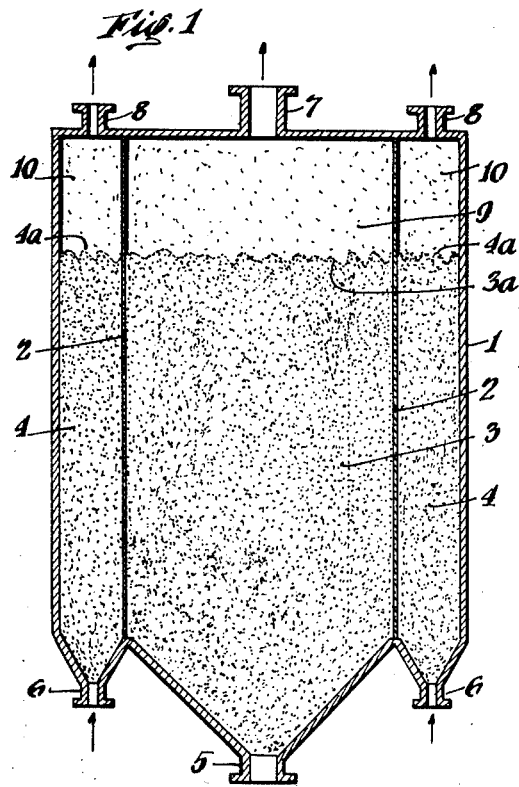
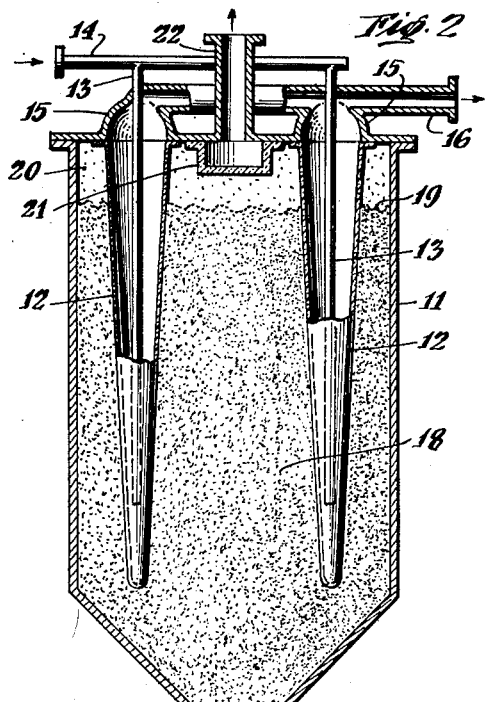
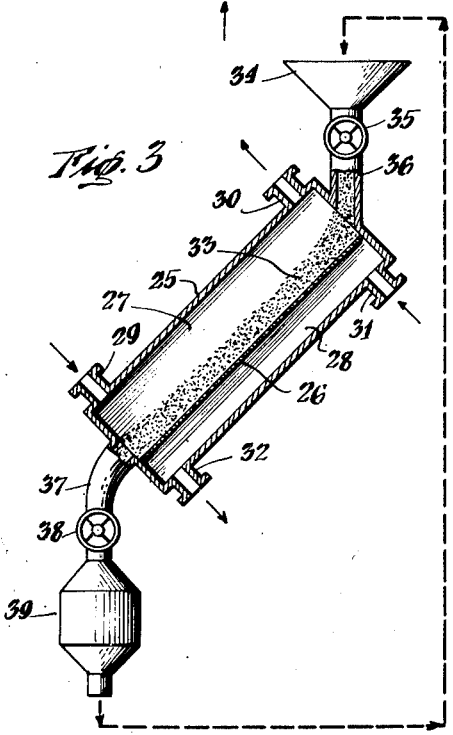
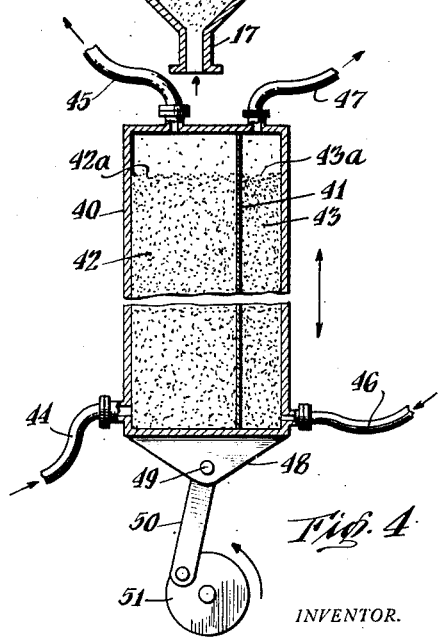
INVENTOR.
Paul W. Garbo

UNITED STATES PATENT OFFICE 2,637,625

GASEOUS DIFFUSION PROCESS

Paul W. Garbo, Long Beach, N. Y.

Application May 21, 1946, Serial No. 671,171

15 Claims. (Cl. 23—2)

This invention relates to the separation of materials in the gaseous state and more particularly to such separation carried out by means of a diffusion barrier.

Tremendous impetus has been given to the application of diffusion processes to commercial operations involving chemical and/or physical treatment of gaseous substances because of the spectacular success of the diffusion technique employed in producing the atomic bomb. In spite of the high state of development reached by the diffusion process for the separation of uranium isotopes, from an economic point of view diffusion as a chemical engineering tool or unit operation is still seriously handicapped by the slowness of separation and/or extensiveness of barrier area required to effect separation.

A primary object of this invention is to increase the rate of diffusion processes. A corollary object is to reduce the barrier area required for any given diffusion process. Other objects will become apparent from the description of the invention which follows.

In accordance with the invention, the diffusion of gaseous materials through suitable porous barriers or membranes is conducted simultaneously with the movement of comminuted solids over the surface of the barriers or membranes. It is generally advisable to use the solids in as fine a state of subdivision as is practical for the particular apparatus employed. Obviously, very fine powders which tend to clog the capillaries of the diffusion barrier should be avoided. In short, the comminuted solids should have a particle size somewhat larger than the diameter of the capillaries in the barrier with which the solids will be used. Generally speaking, the desirable particle sizes will be found in the sieve size range of about 60 to 325 mesh, preferably about 100 to 200 mesh. However, in the various cases that may be encountered it is possible to use appreciably coarser and finer solids.

The solids selected for any given operation should be such that they will not adversely affect the gaseous materials coming in contact therewith. Furthermore, it is advantageous to select solids which are of such hardness and particle shape as will avoid or minimize abrasion of the diffusion barrier.

The movement of the comminuted solids over a diffusion barrier can be achieved in many different ways. Thus, one simple method is to place the diffusion barrier steeply inclined to the horizontal plane and drop powdered material on the barrier near its upper end so that the powder will flow over the barrier to its lower end. Another method involves disposing the diffusion barrier in contact with a mass of powdered material and then shaking or otherwise vibrating the apparatus to cause movement of the powder over the surface of the barrier. My preferred method, however, is based on the use of the fluidization technique which has been widely applied in the cracking of petroleum fractions with powdered catalysts. Fludiziation is established by passing a stream of gas or vapor upwardly through a mass of powdered material with such a velocity as to suspend, and yet permit slippage or "hindered settling" of, the powder in the gaseous stream. Under these conditions, the individual particles of the mass describe random movements and the fluidized mass assumes the turbulent appearance of a boiling liquid.

To describe and clarify the principles of my invention in greater detail, reference is made to the accompanaying drawings which are schematic representations of typical forms of apparatus suitable for carrying out improved gaseous diffusion processes.

Figure 1 is a sectional elevation of a gas diffusion cell wherein fluidized powder is maintained in contact with both faces of the porous barrier;

Figure 2 is a sectional elevation of another cell wherein the diffusion barrier is in the form of hollow cones immersed in a fluidized mass of powder;

Figure 3 is a sectional side view of a sloping cell wherein comminuted solids charged at the upper end slide across the top surface of the barrier to the lower end of the cell; and Figure 4 is a sectional elevation of a cell having powdered material on both sides of the porous membrane and mechanical means for moving the cell up and down and thus causing the powdered material to be shaken within the cell.

In Figure 1, the diffusion cell 1 may be circular, rectangular or of any desired shape in horizontal cross-section. If the horizontal section of the cell is circular, the porous barrier 2 is a tube of smaller diameter than that of the cell so that a central zone 3 and an annular zone 4 are formed within cell 1. If cell 1 is rectangular in horizontal cross-section, then a pair of barrier walls 2, disposed parallel to each other, divide the cell into a central zone 3 and two outer zones 4 along opposite sides of the cell. The gaseous mixture which is to be separated or enriched enters central zone 3 through pipe 5 and leaves through pipe 7. A purge gas to sweep out of zone 4 the gas which has diffused through barrier 2 enters through pipe 6 and leaves together with the diffused gas through pipe 8. As thus far described, cell 1 might be said to be representative of cells adapted for performing conventional diffusion processes. However, in accordance with the invention, zone 3 has a fluidized mass of comminuted solids with a pseudo-liquid level 3a, while zone 4 holds a similar mass with pseudo-liquid level 4a. The gaseous mixture entering by way of pipe 5 passes up through zone 3 at such a velocity that the powder therein is fluidized. In the form of powders of about 100 to 200-mesh particle size, most of the common materials encountered, such as clay, silica, copper and magnetite, are usually fluidized at gas velocities in the range of about 0.1 to about 5 feet per second, preferably about 0.5 to about 2.0 feet per second. The original gas entering through pipe 5 less the portion which has diffused through the barrier 2 into zone 4 becomes disengaged from the bulk of the powdered mass in zone 3 at the pseudo-liquid level 3a, passes up through gas space 9 and is discharged through pipe 7. Any entrained solids which do not drop out of the gas in space 9 are carried out through pipe 7 by the gas to a cyclone, electrostatic precipitator or other separator for removing fine solids from gases. The solids so recovered are returned to zone 3 in any desired manner, e. g., by suspension in the gaseous stream entering through pipe 5.

While the fluidized mass of powder in zone 3 increases the rate of gaseous diffusion through the porous membrane 4 over that observed in the absence of the moving particles, a further increase is made possible by fluidizing powder in zone 4 in contact with the other face of the membrane 4. Thus, the purge gas entering through pipe 6 flows up through zone 4 fluidizing the powder and sweeping out the gas which has permeated through diffusion barrier 4. The combined gases become disengaged from the bulk of the powder at pseudo-liquid level 4a, pass through gas space 10 and leave through pipe 8. Entrained solids may be handled in the same manner as was discussed for the operation of zone 3. The mixture of purge gas and diffused gas is then separated by conventional methods, e. g., condensation of one component, or otherwise treated as desired.

Figure 2 shows a vessel or cell 11 with a plurality of hollow conical barriers 12 suspended therein. Around the conical barriers 12 there is a fluidized mass of comminuted solids 18 with a pseudo-liquid level 19. The gaseous mixture which is to be subjected to separation by diffusion enters through pipe 17 and fluidizes the powdered mass 18. Part of the gaseous mixture diffuses into the hollow cones 12 from which it is withdrawn by way of domes 15 and manifold pipe 16. To facilitate the prompt removal of the diffused gas from the hollow cones 12, it is advantageous to feed a purge gas into manifold pipe 14 from which it discharges into cones 12 by way of internal tubes 13. The purge gas thus sweeps out the diffused gas by flowing up through domes 15 and manifold 16. The residual gas in the cell emerging from the pseudo-liquid level 19, flows through gas space 20 and passes through a filter 21, e. g., a porous alundum tube, which prevents the escape of powder by entrainment in the gas. The residual gas freed of powder then discharges from the cell through pipe 22.

It is well to note that the conical shape of the barrier elements 12 serves to compensate for changes in the volumes of the gases along the height of the cell and, accordingly, to maintain substantially uniform gas velocities up through the cell. Thus, as the gas mixture flows up through the fluidized mass 18 its volume decreases steadily because part of the gas diffuses into hollow cones 12. At the same time, the gas in each cone 12 increases in volume as the gas moves up from the apex to the discharge dome 15. The conical shape of the barrier elements 12 compensates for these volume changes by providing in a direction upward through the cell an increasing cross-sectional area within the barriers and a decreasing cross-sectional area outside of the barriers.

An advantageous modification of the diffusion system just described is to fill the hollow cones 12 with finely divided solids which are then kept in a fluidized state by the purge gas fed into the cones by internal tubes 13. The fluidized solids within the cones tend to increase further the rate of gaseous diffusion through the porous membranes beyond the improved rate attained by the fluidization of solids in contact with only the exterior surfaces of the membranes.

Figure 3 schematically presents a diffusion cell 25 with a sloping barrier partition 26 forming zones 27 and 28 therein. The gaseous mixture to be processed in the cell enters through pipe 29, flows up along barrier 26 through zone 27 and leaves through pipe 30. Some of the gas in zone 27 diffuses through barrier 26 into zone 28. Purge gas fed through pipe 31 assists in withdrawing the diffused gas from zone 28 by way of pipe 32. In accordance with the invention, the rate of gaseous diffusion through the porous partition 26 is increased by causing comminuted solids to slide down across the upper surface of partition 26. For this purpose, solids placed in hopper 34 are charged through rotary bucket-type valve 35 and pipe 36 into zone 27. The resulting moving layer 33 of solids on partition 26 gravitates to pipe 37. Another rotary valve 38, operating at the same rate as valve 35, discharges the solids into hopper 39. Conveyor and elevator means (not shown) return the solids from hopper 39 to hopper 34 to complete the cyclic movement and thus ensure continuous circulation of solids over the porous barrier 26.

In Figure 4, the diffusion cell 40 is partitioned by membrane 41 into zones 42 and 43 containing masses of finely divided solids with top surfaces 42a and 43a, respectively. The gaseous mixture to be enriched by diffusion flows through flexible hose 44 into zone 42 and leaves through hose 45. Part of the gas in zone 42 diffuses through barrier 41 into zone 43. Purge gas entering through hose 46 facilitates the removal of diffused gas from zone 43 by way of hose 47. The base member 48 of cell 40 is provided with a bearing 49 with which is associated a connecting rod 50. The other end of rod 50 is eccentrically connected to a rotating element 51. Cell 40 is mounted between upright guides (not shown) which permit the cell to slide up or down. The rotation of element 51 imparts through rod 50 a vertical reciprocating motion to cell 40. The frequency and amplitude of reciprocating motion are adjusted so as to shake the powder in zones 42 and 43 and maintain it in good rubbing contact with the faces of barrier 41 substantially continuously. Operating in this manner, the solids are kept in a fluent and agitated state resembling the state attained by the fluidization technique. However, mechanical agitation as exemplified by the apparatus of Figure 4 permits operation of the diffusion cell to achieve the purposes of the invention under conditions which are not conducive to effective fluidization, for example, passing the gases through the cell at very low velocities.

It is clear that the principles of this invention are applicable to any process involving the diffusion of gas through a porous barrier or membrane without any restrictions relative to the gases separated or enriched, the type of barrier employed, the pressure in the cell, etc. Those skilled in the art of gaseous diffusion will appreciate that operating conditions in any diffusion process, such as the size of the pores or capillaries in the barrier, the gas pressure in the cell and the rate of passage of gas through the cell, should be carefully controlled in order to obtain a high separation efficiency. The work of Lorenz and Magnus, reported in Z. anorg. allgem. Chem. 136, 97–133 (1924), is representative of the available technical literature on gaseous diffusion operations.

The barriers selected for the cells may be made of metals or nonmetallic materials depending upon the service conditions to which they will be exposed. Since the fabrication of diffusion barriers is well established and does not constitute a part of this invention, details of barrier preparation need not be presented herein.

It has been stated hereinbefore that the comminuted solids used in any given diffusion system should be of such composition as not to adversely influence or react with the gases in the diffusion cell. This is not to say that only inert solids may be used and that solids which interact with the gases in a beneficial or desirable way are precluded. To the contrary, it is preferred to select solids which function not only to improve the rate of gaseous diffusion by their movements along the surface of the porous membrane but also to bring about an independent useful result. Thus, for instance, a two-component gaseous mixture containing a small proportion of impurity, e. g., hydrogen sulfide, may be subjected to separation by gaseous diffusion while maintaining in contact with the porous barrier a moving mass of a powdered solid capable of taking up the gaseous impurity by physical adsorption or chemical reaction. In such case, the powder would be periodically or continuously withdrawn from the diffusion cell and replaced by fresh or regenerated powder in order to prevent the powder in the cell from becoming completely spent and thus inoperative in respect to the continued clean-up of impurity in the gaseous mixture. Another type of dual-purpose comminuted solid is one that catalyzes a desired reaction in a gaseous mixture which is undergoing separation or enrichment by diffusion. To illustrate this form of the invention, reference will be made to the classic water-gas shift reaction:

$$CO + H_2O = CO_2 + H_2$$

The gaseous effluent from a conventional water-gas generator comprising carbon monoxide and dioxide, hydrogen and water vapor is passed at an elevated temperature into a diffusion cell, such as that of Figure 1, having a barrier which permits the preferential diffusion of hydrogen. The cell holds a mass of powdered iron oxide catalyst which is fluidized by the incoming gases. The contact of the gases with the powdered iron oxide at an elevated temperature, say about 800° F., catalyzes the foregoing reaction in the direction of producing hydrogen which for many purposes is the desired component. While the gases are flowing through the fluidized mass of catalyst in the diffusion cell, some of the original hydrogen as well as newly formed hydrogen diffuses through the porous barrier at a higher rate than would obtain in the absence of the fluidized mass. This diffusion of hydrogen has two important advantages. First, the diffused hydrogen is readily recoverable as an enriched stream, and second, the loss of hydrogen by diffusion from the mixture in contact with the fluidized catalyst favors the production of additional hydrogen in accordance with the physico-chemical law of mass action. Accordingly, the moving particles of iron oxide catalyst function simultaneously to increase the rate of gaseous diffusion through the porous membrane and to promote the production of hydrogen. Numerous analogous chemical reactions of gases or vapors which would be doubly benefited by the foregoing form of the invention will occur to those skilled in the art.

It is indeed surprising that the simple expedient of maintaining moving particles in good rubbing contact with one or both sides of a porous barrier can improve the diffusion process. While my invention is not to be limited by any theory of operation, I have postulated a mechanism that may account for the unexpected results. I visualize that the usual operation of a diffusion cell leads to the formation of slow-moving films of gas on both faces of the porous barrier with consequent retardation of the diffusion process but that the use of moving particles in contact with the barrier tends to disrupt or minimize the film and thus facilitates the unobstructed flow of gas by diffusion through the barrier. Furthermore, where fluidization is employed to maintain the moving particles in rubbing relation with the barrier, I imagine that another useful influence may be exerted on the diffusion process. It would appear that as a stream of a gaseous mixture flows along the surface of a porous membrane the layers of the stream closest to the membrane become deficient in the diffused component and the rate of diffusion is slowed down by this impoverishment until the same component flows from the farthest layers of the stream to those closest to the membrane. In fluidization, the gaseous mixture is constantly in turbulent motion so that the portion of the stream closest to the barrier at any level in the fluidized mass is at all times substantially the same in composition as the portion farthest from the barrier. In short, fluidization gives rapid, continuous mixing which prevents stratification of the gaseous mixture flowing up along the surface of the barrier.

The presence of a body of moving particles, particularly fluidized particles, in contact with a membrane for gaseous diffusion offers an opportunity for closely controlling the temperature of the operation. Diffusion processes are known to require accurate temperature regulation since temperature variations lead to pressure and velocity fluctuations, eddy currents in the gaseous stream flowing through the diffusion cell, and other effects which impair operational efficiency. A body of moving particles within the diffusion cell acts as a thermal flywheel stabilizing and equalizing the temperature throughout the cell. In addition, heat transfer surfaces, e. g., tubes or coils, disposed in the cell and surrounded by the mass of moving powder may be used for close temperature control. In the absence of the powder such heat transfer surfaces would set up disturbing eddy currents in the gaseous stream. The combination of heat transfer tubes or coils and fluidized solids in a diffusion cell is especially advantageous where the mixture of gases flowing therethrough is at the same time undergoing chemical reaction. In such instance, heat is readily added or withdrawn, respectively, for an endothermic or exothermic reaction by circulating a suitable fluid through the tubes or coils. The fluidized solids assure a rapid and even transfer of heat between the gaseous stream and the tube or coil surfaces.

Those skilled in the art will visualize many other modifications and variations of the invention set forth hereinabove without departing from its spirit and scope. Accordingly, the claims should not be interpreted in any restrictive sense other than that imposed by the limitations recited within the claims.

What I claim is:

1. The improved gaseous diffusion process for the separation of mixed gases, which comprises passing a gaseous mixture along one surface of a diffusion barrier adapted to permit the preferential diffusion therethrough of one component of said gaseous mixture, while maintaining moving solid particles in contact with said surface of said barrier, and recovering the gaseous diffusate.

2. The improved gaseous diffusion process for the separation of mixed gases, which comprises passing a gaseous mixture through a mass of comminuted solids under fluidizing conditions, the thus fluidized mass being in contact with a diffusion barrier adapted to permit the preferential diffusion therethrough of one component of said gaseous mixture, and recovering the gaseous diffusate.

3. The improved gaseous diffusion process for the separation of mixed gases, which comprises passing a gaseous mixture along one surface of a diffusion barrier adapted to permit the preferential diffusion therethrough of one component of said gaseous mixture, passing a purge gas along the other surface of said barrier, while maintaining moving solid particles in contact with at least one of said surfaces of said barrier, and recovering the gaseous diffusate together with said purge gas.

4. The improved gaseous diffusion process for the separation of mixed gases, which comprises passing a gaseous mixture along one surface of a diffusion barrier adapted to permit the preferential diffusion therethrough of one component of said gaseous mixture, passing a purge gas along the other surface of said barrier, while maintaining a mass of fluidized solid particles in contact with at least one of said surfaces, and recovering the gaseous diffusate together with said purge gas.

5. The improved gaseous diffusion process for the separation of mixed gases, which comprises simultaneously passing a gaseous mixture under fluidizing conditions through a mass of powder in contact with one surface of a diffusion barrier adapted to permit the preferential diffusion therethrough of one component of said gaseous mixture, passing a purge gas under fluidizing conditions through a mass of powder in contact with the other surface of said barrier, and withdrawing separate gaseous streams from the two said masses of fluidized powder.

6. The process of claim 5 wherein the gaseous mixture comprises two principal components and one minor component and the fluidized powder in contact with the first said surface of the diffusion barrier is capable of reacting with a component of said gaseous mixture to remove it from said gaseous mixture.

7. The process of claim 5 wherein the gaseous mixture comprises two principal components and one minor component and the fluidized powder in contact with the first said surface of the diffusion barrier is capable of adsorbing a component of said gaseous mixture to remove it from said gaseous mixture.

8. The improved process for conducting catalytic reactions of gaseous reactants, which comprises passing the gaseous reactants at reaction conditions through a mass of powdered catalyst at a fluidizing velocity, maintaining the thus fluidized catalyst mass in contact with a diffusion barrier adapted to permit the preferential diffusion therethrough of one gaseous product of reaction, withdrawing reaction gases from said fluidized catalyst mass, and recovering the gas diffusing through said barrier.

9. The improved process for conducting catalytic reactions of gaseous reactants, which comprises passing the gaseous reactants at reaction conditions through a mass of powdered catalyst at a fluidizing velocity, maintaining the thus fluidized catalyst mass in contact with one side of a diffusion barrier adapted to permit the preferential diffusion therethrough of one gaseous product of reaction, passing a purge gas at a fluidizing velocity through a mass of powder in contact with the other side of said barrier, and withdrawing separate gaseous streams from the two said fluidized masses.

10. In gaseous diffusion processes involving the use of a diffusion barrier for the separation of mixed gases, the improvement which comprises maintaining a substantially continuous layer of moving, finely divided, solid particles in contact with the diffusion barrier.

11. In gaseous diffusion processes involving the use of a diffusion barrier for the separation of mixed gases, the improvement which comprises maintaining a mass of fluidized solid particles in contact with the diffusion barrier.

12. The improved gaseous diffusion process for the separation of mixed gases, which comprises simultaneously passing a gaseous mixture through an agitated mass of powder in contact with one surface of a diffusion barrier adapted to permit the preferential diffusion therethrough of one component of said gaseous mixture, passing a purge gas through an agitated mass of powder in contact with the other surface of sadi barrier, and withdrawing separate gaseous streams from the two said agitated masses of powder.

13. The process of claim 12 wherein the gaseous mixture comprises two principal components and one minor component and the agitated mass of powder in contact with the first said surface of the diffusion barrier is capable of combining with said minor component of said gaseous mixture.

14. The improved process for conducting catalytic reactions of gaseous reactants, which comprises passing the gaseous reactants at reaction conditions through an agitated mass of powdered catalyst, maintaining said agitated mass of catalyst in contact with one side of a diffusion barrier adapted to permit the preferential diffusion therethrough of one gaeous product of reaction, passing a purge gas along the other side of said barrier, and withdrawing separate gaseous streams from the two opposite sides of said barrier.

15. The process of claim 14 wherein the purge gas passes through an agitated mass of powder in contact with said other side of said barrier.

PAUL W. GARBO.

References Cited in the file of this patent

UNITED STATES PATENTS

| Number | Name | Date |
|---|---|---|
| 1,124,347 | Snelling | Jan. 12, 1915 |
| 1,174,631 | Snelling | Mar. 7, 1916 |
| 1,496,757 | Lewis et al. | June 3, 1924 |
| 1,951,280 | Hale et al. | Mar. 13, 1934 |
| 1,984,380 | Odell | Dec. 18, 1934 |
| 2,062,358 | Frolich | Dec. 1, 1936 |
| 2,255,069 | Maier | Sept. 9, 1941 |
| 2,364,145 | Huppke | Dec. 5, 1944 |
| 2,380,391 | Bates | July 31, 1945 |
| 2,388,095 | Stahly | Oct. 30, 1945 |
| 2,429,751 | Gohr et al. | Oct. 28, 1947 |
| 2,431,632 | Brandt | Nov. 25, 1947 |

FOREIGN PATENTS

| Number | Country | Date |
|---|---|---|
| 196,972 | Great Britain | May 4, 1923 |